E. J. DUFF.
CUSHION TIRE FOR VEHICLE WHEELS.
APPLICATION FILED JULY 24, 1907.

912,943.

Patented Feb. 16, 1909.

WITNESSES

INVENTOR
Edward James Duff
BY
Howson and Howson
ATTORNEYS

UNITED STATES PATENT OFFICE.

EDWARD JAMES DUFF, OF LIVERPOOL, ENGLAND.

CUSHION-TIRE FOR VEHICLE-WHEELS.

No. 912,943.

Specification of Letters Patent.

Patented Feb. 16, 1909.

Application filed July 24, 1907. Serial No. 385,261.

*To all whom it may concern:*

Be it known that I, EDWARD JAMES DUFF, a subject of the King of Great Britain and Ireland, and a resident of Liverpool, in the county of Lancaster, England, have invented certain new and useful Improvements in Cushion-Tires for Vehicle-Wheels, and of which the following is the specification.

Various attempts have been made to secure in tires greater resiliency than that given by solid rubber, and, at the same time, to avoid the disabilities inherent in the pneumatic variety. What are known as "cushion" tires have been formed with various forms of hollow areas within them, some surrounded by rubber, others arch-like and others in which there were a plurality of hollow spaces.

A tire made according to the present invention belongs to the last mentioned class, but in it the parts and areas are proportioned to give certain specific results hereinafter explained:

Essentially the tire in cross section is parallelogrammic with the tread at one acute angle and the rim at the other acute angle of the parallelogram, while the obtuse angles are joined by a tensional member. That is to say, there are formed in the tire two hollows of substantially triangular section—the upper, base down; the lower, base up. Surrounding these apertures are masses of rubber, the median lines of whose areas form a parallelogram joined at its obtuse angles by a horizontal line.

The rubber areas or members are sufficiently substantial to resist lateral deformation so that they, with the exception of the horizontal tensional member, are subjected solely to compression.

Owing to the parallelogrammic form the members act as double toggles controlled by the tensional member midway between their fulcra which are at rim and tread. The tire therefore offers a resistance which does not increase with the rapidity of a solid rubber tire under load, and, on the other hand, does not deform suddenly as do the majority of arch-like or other hollow tires. The improved tire therefore has practically all the attributes of a pneumatic tire without its liability to puncture and bursting and at a lower cost.

Figure 1:
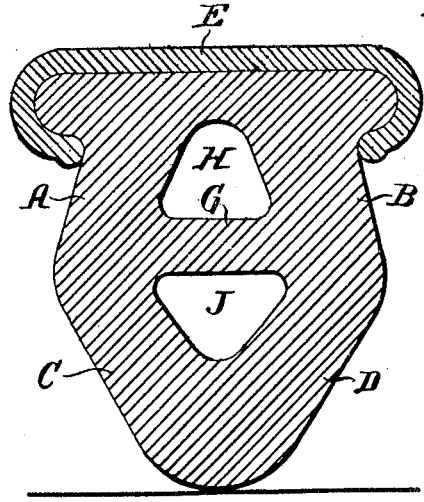
Figure 2:
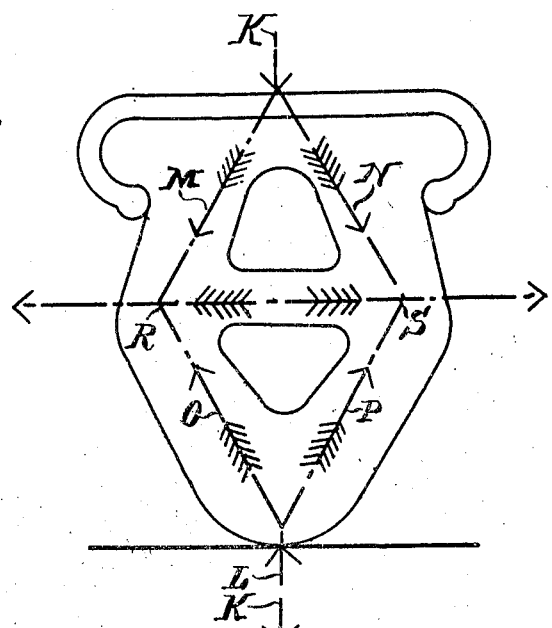
Figure 3:
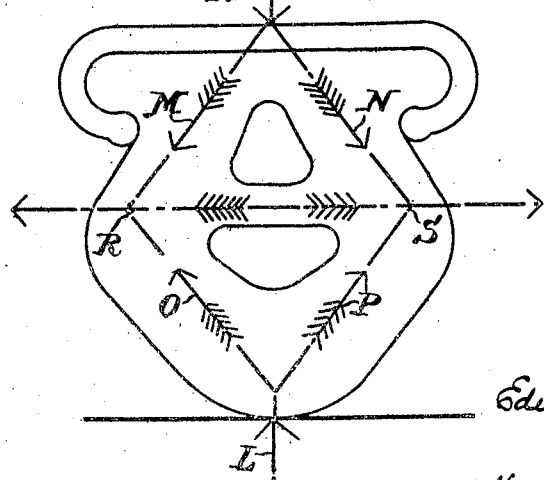

In order that the invention and the manner of performing the same may be properly understood, there is hereunto appended a sheet of explanatory drawings showing in section in Figure 1, an example of the improved form of tire, and in Figs. 2 and 3, diagrams of the action of the parts of that tire under load.

In this example, as has already been explained, the tire consists of four members, A, B, C, D, together forming a parallelogram with its acute angles disposed vertically, one at the tread, the other at the rim, E. A fifth and tensional member, G, connects the obtuse angles of the members, A, B, C, D, and divides the central hollow into two triangular spaces, H, J.

As explained by the diagram Fig. 2, showing the tire under normal load in which arrows substantially median to the members indicate the lines of force under normal load, the forces, K, L, of load and upward resistance equal and opposite, are each split into two, M, N, and O, P, median to the parallelogram members. The forces M and O combine to form the force R, while the forces N and P combine to form the force S.

It will be seen that M, N, O, P, are compressional in the parallelogram members, A, B, C, D, (Fig. 1) and that R, S, are jointly tensional in the member, G.

As shown in Fig. 3, since the forces of compression, M, N, O, P, act upon the median lines of the parts through which they pass, these parts are in direct compression at all times and do not become distorted laterally as do the walls of circular or arch-section tires, and thus the resistance they offer is at all times commensurate with the load. In addition, the tensional member, G, retains the members, A, B, C, D, against undue spreading or flattening and adds its tensional resistance to the compressional resistance of the members, A, B, D, C.

As the outer members of the tire are at all times in compression its surface is much less liable to be cut.

It will further be seen that as the load thrown upon the tire by road inequalities increases, the effort to compress the compression members increases in enhanced ratio as does also the tension in the tensional part— thus the period of elasticity is very greatly enhanced over known forms.

It is to be understood that the tread part may be of any desired form and that the upper part may be shaped to fit any suitable form of rim.

What I claim is:—

1. A cushion tire essentially parallelogrammic in cross section with the acute angles vertical and having a horizontal tensional member joining the obtuse angles, the legs of said parallelogram being of substantially the same length and strength and producing a double toggle action with relation to said horizontal member, substantially as described.

2. A cushion tire essentially parallelogrammic in cross section with the acute angles vertical and having a horizontal tensional member joining the obtuse angles, the legs of said parallelogram being of substantially uniform material and strength and producing a double toggle action with relation to said horizontal member, substantially as described.

3. A cushion tire essentially parallelogrammic in cross section with the acute angles vertical and having a horizontal tensional member joining the obtuse angles, said tire being so formed internally and externally that the legs of the parallelogram are substantially straight so as to produce a double toggle action with relation to said horizontal member, substantially as described.

In testimony whereof I have signed my name to this specification, in the presence of two subscribing witnesses.

EDWARD JAMES DUFF.

Witnesses:
WILLIAM TOWNS,
RALPH GIBBS.